United States Patent
Valsecchi et al.

(10) Patent No.: US 10,855,059 B2
(45) Date of Patent: Dec. 1, 2020

(54) COMPARTMENT-PARTITIONING AND BUSBAR-SUPPORTING DEVICE IN A CABINET FOR A LOW VOLTAGE ELECTRICAL SWITCHBOARD

(71) Applicant: ABB S.p.A., Milan (IT)

(72) Inventors: Davide Valsecchi, Seregno (IT); Giuseppe Nava, Ponte Lambro (IT)

(73) Assignee: ABB S.P.A., Milan (IT)

( * ) Notice: Subject to any disclaimer, the term of this patent is extended or adjusted under 35 U.S.C. 154(b) by 0 days.

(21) Appl. No.: 16/128,005

(22) Filed: Sep. 11, 2018

(65) Prior Publication Data
US 2019/0081461 A1 Mar. 14, 2019

(30) Foreign Application Priority Data

Sep. 11, 2017 (EP) ..................... 17190422

(51) Int. Cl.
| | |
|---|---|
| *H02B 1/21* | (2006.01) |
| *H01B 17/56* | (2006.01) |
| *H01R 25/16* | (2006.01) |

(52) U.S. Cl.
CPC ............ *H02B 1/21* (2013.01); *H01B 17/56* (2013.01); *H01R 25/161* (2013.01)

(58) Field of Classification Search
None
See application file for complete search history.

(56) References Cited

U.S. PATENT DOCUMENTS

| | | | |
|---|---|---|---|
| 4,374,405 A | 2/1983 | Olashaw et al. | |
| 5,950,974 A * | 9/1999 | Hoffmann | H02B 1/202 248/223.41 |

(Continued)

FOREIGN PATENT DOCUMENTS

| | | |
|---|---|---|
| EP | 2912735 A2 | 9/2015 |
| WO | 2014064617 A2 | 5/2014 |

OTHER PUBLICATIONS

European Patent Office, Extended Search Report issued in corresponding Application No. 17190422.0, dated Feb. 19, 2018, 7 pp.

*Primary Examiner* — Xanthia C Cunningham
(74) *Attorney, Agent, or Firm* — Taft Stettinius & Hollister LLP; J. Bruce Schelkopf

(57) ABSTRACT

A compartment-partitioning and busbar-supporting device for a cabinet for a low voltage electrical switchboard an insulating body having a substantially rectangular shape with a first surface configured for coupling with one or more busbars and a second surface configured for coupling with one or more electrical apparatuses, said first and second surfaces being delimited by a first and a second opposite side substantially parallel to each other and configured for coupling with a vertical uprights or horizontal crossbars of the supporting structure of the low voltage electrical switchboard, and a third and a fourth opposite sides substantially parallel to each other and perpendicular to said first and second opposite sides and configured for allowing vertical stacking of a plurality of said compartment-partitioning and busbar-supporting devices in correspondence of said third and fourth opposite sides, said first surface being provided with a plurality of retaining pairs of first and second retaining means facing each other and defining a retaining space for a busbar among them, the retaining pairs for a given busbar being aligned in a direction parallel to said first and second opposite sides and the retaining pairs for different busbars being spaced apart in a direction parallel to said third and a fourth opposite sides, said second surface being provided with a plurality of openings configured for allowing insertion of connection means between said electrical apparatuses and said busbars through said compartment-partitioning and busbar-supporting device.

20 Claims, 12 Drawing Sheets

(56) References Cited

U.S. PATENT DOCUMENTS

| | | | | |
|---|---|---|---|---|
| 6,270,361 B1* | 8/2001 | Onizuka | ............... | H01R 9/226 |
| | | | | 439/76.2 |
| 6,781,818 B2* | 8/2004 | Josten | ..................... | H02B 1/21 |
| | | | | 174/149 B |
| 8,134,070 B2* | 3/2012 | Hirschfeld | ............. | H02B 1/565 |
| | | | | 174/133 B |
| 8,270,167 B2* | 9/2012 | Greenwood | ............. | H02G 5/10 |
| | | | | 361/704 |
| 8,305,739 B2* | 11/2012 | Dozier | .................. | H02B 1/056 |
| | | | | 174/50 |
| 8,379,374 B2* | 2/2013 | Keegan | ............... | H01R 25/142 |
| | | | | 174/68.2 |
| 8,420,935 B2* | 4/2013 | Malkowski, Jr. | ........ | H02B 1/21 |
| | | | | 174/68.2 |
| 8,547,684 B2* | 10/2013 | Diaz | ....................... | H02B 1/20 |
| | | | | 361/624 |
| 8,625,257 B2* | 1/2014 | Schalk | ................... | H02B 1/056 |
| | | | | 361/656 |
| 8,921,701 B2* | 12/2014 | Lejawka | ............... | H02G 5/025 |
| | | | | 174/163 R |
| 9,337,596 B2* | 5/2016 | El Zakhem | .......... | H01R 25/162 |
| 9,391,413 B2 | 7/2016 | Blasbalg et al. | | |
| 9,608,414 B2* | 3/2017 | Pellicano | ................ | H02B 1/36 |
| 9,812,848 B2* | 11/2017 | Bellows | .................. | H02B 1/21 |
| 2017/0098929 A1 | 4/2017 | Serdynski et al. | | |

* cited by examiner

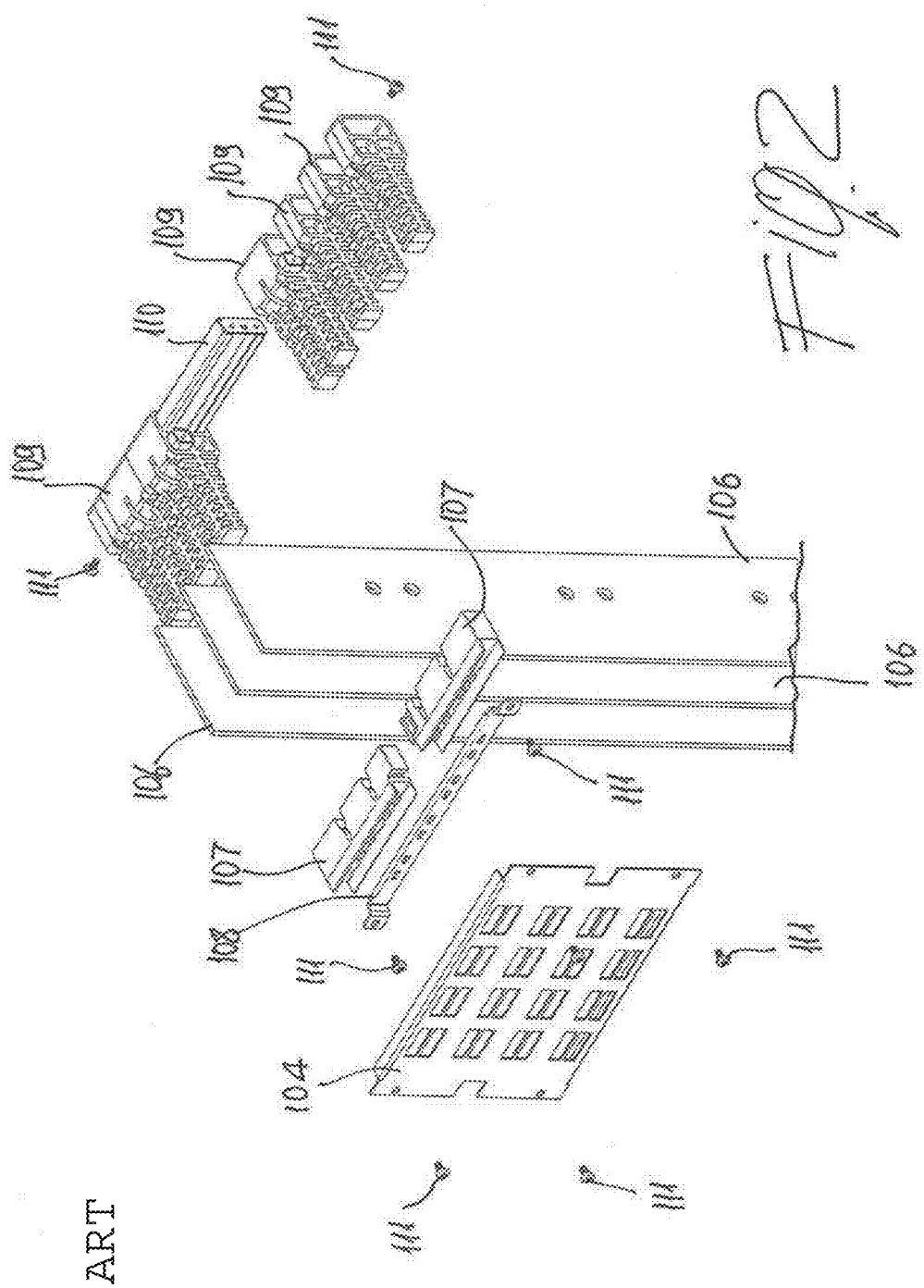

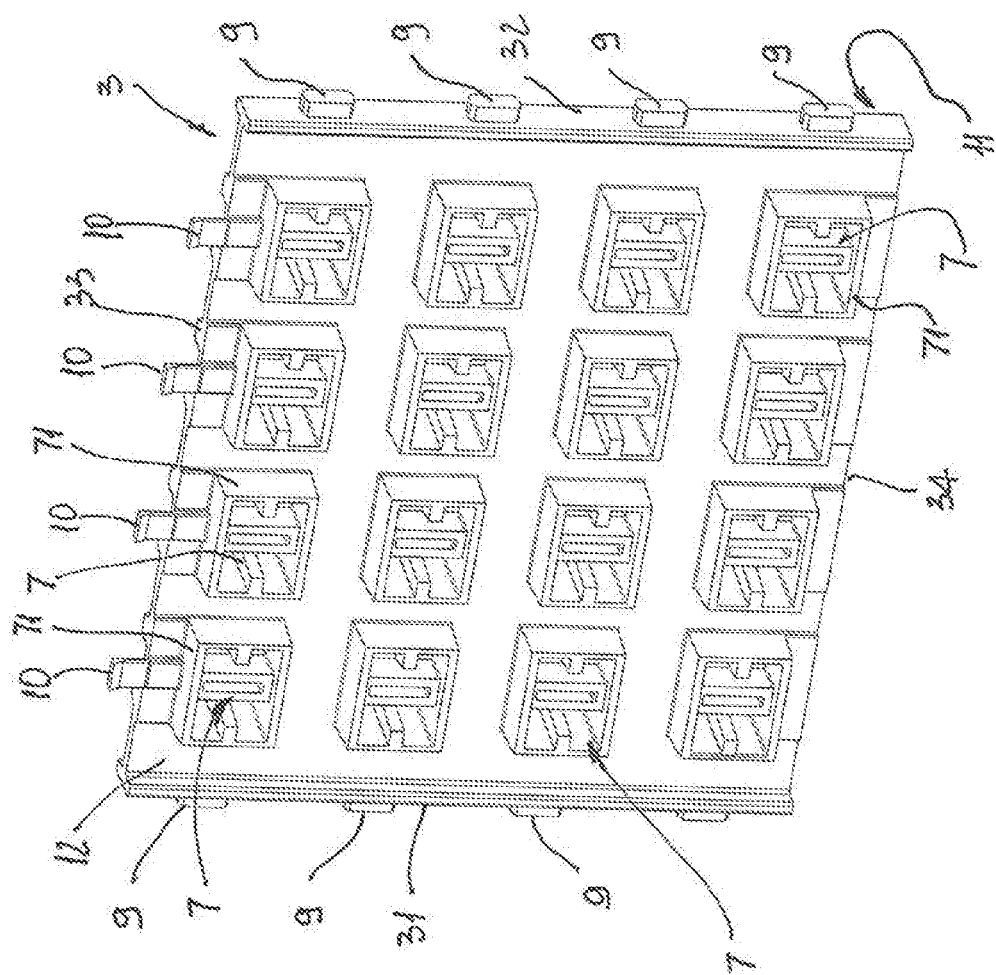

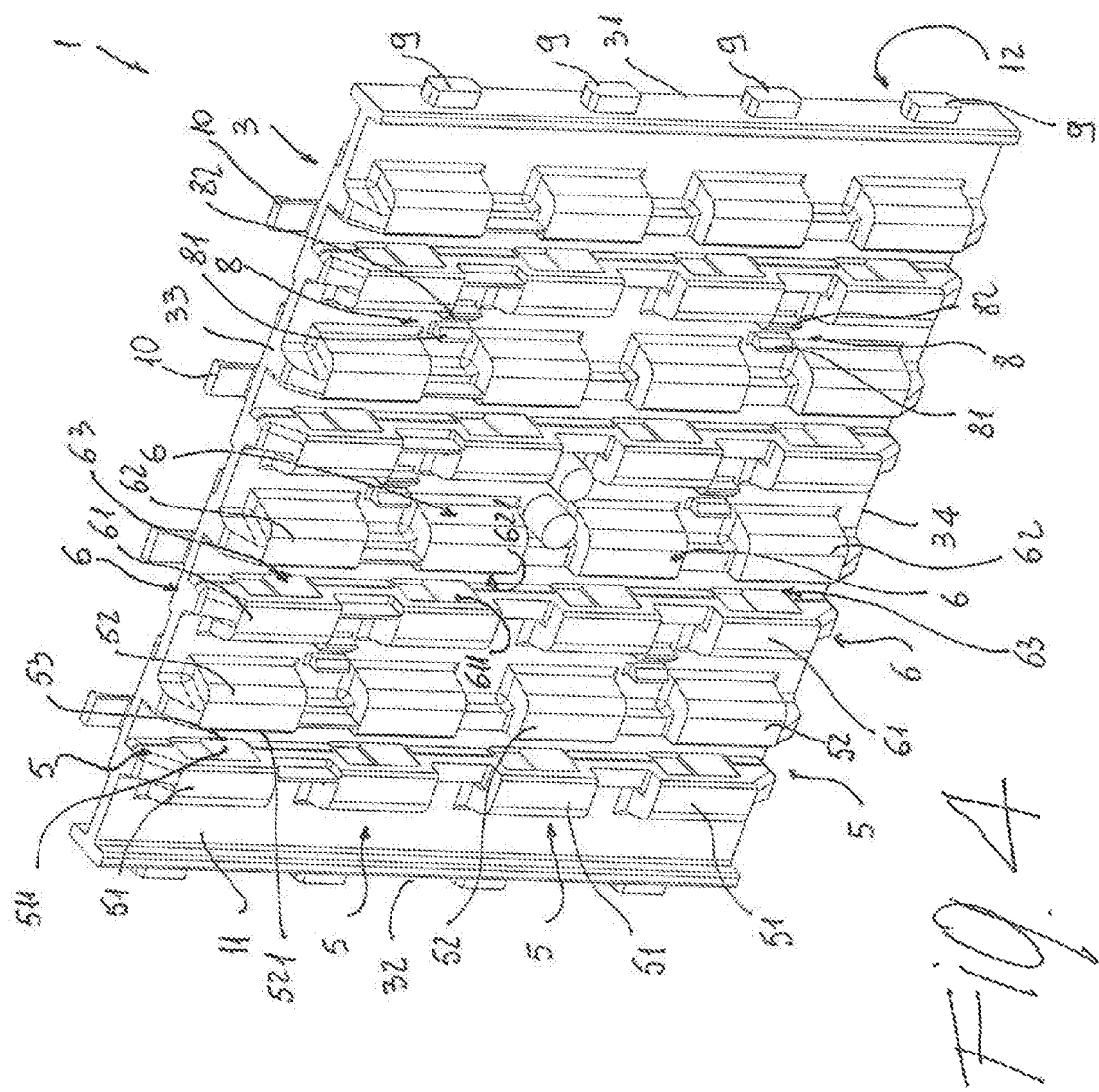

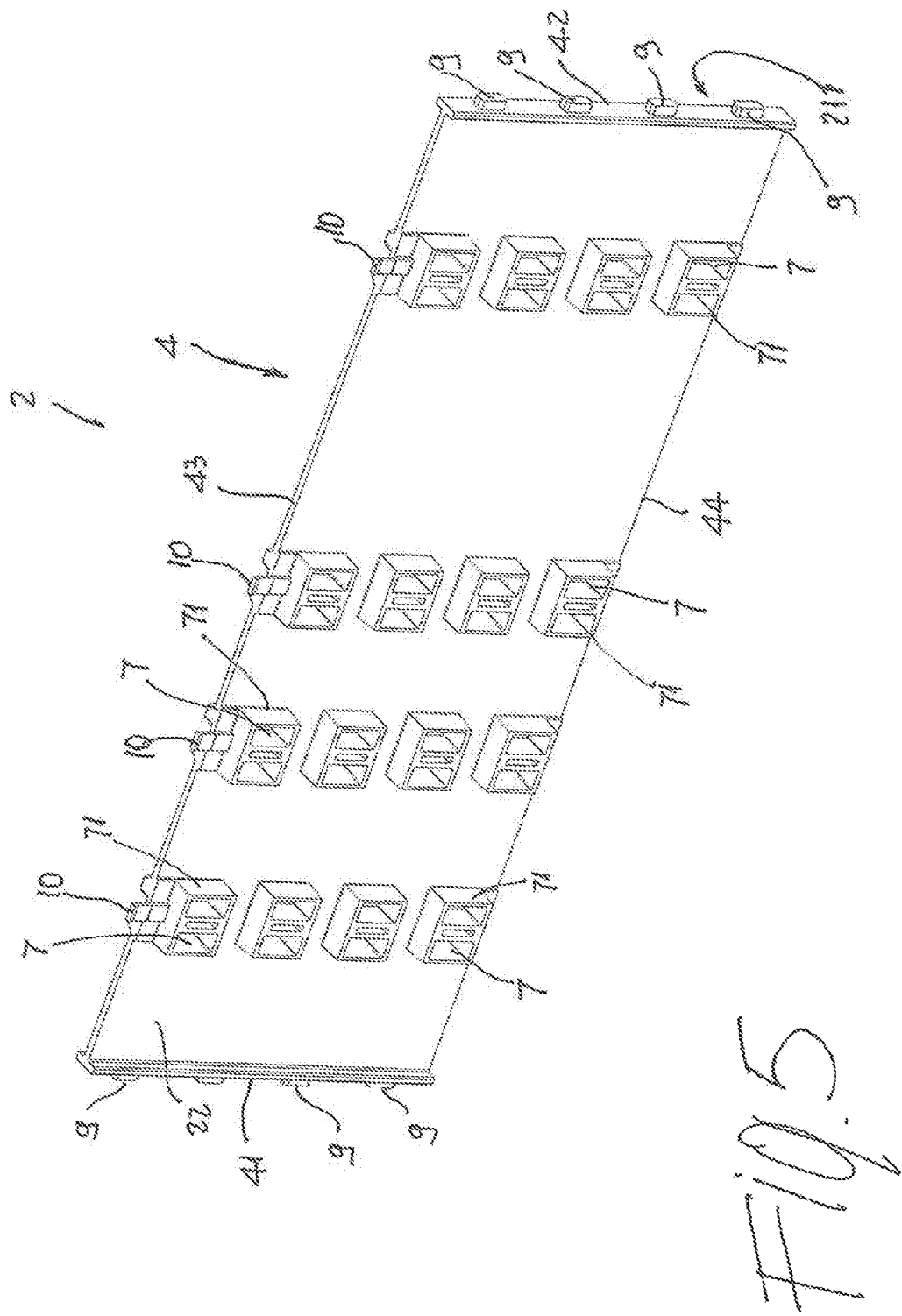

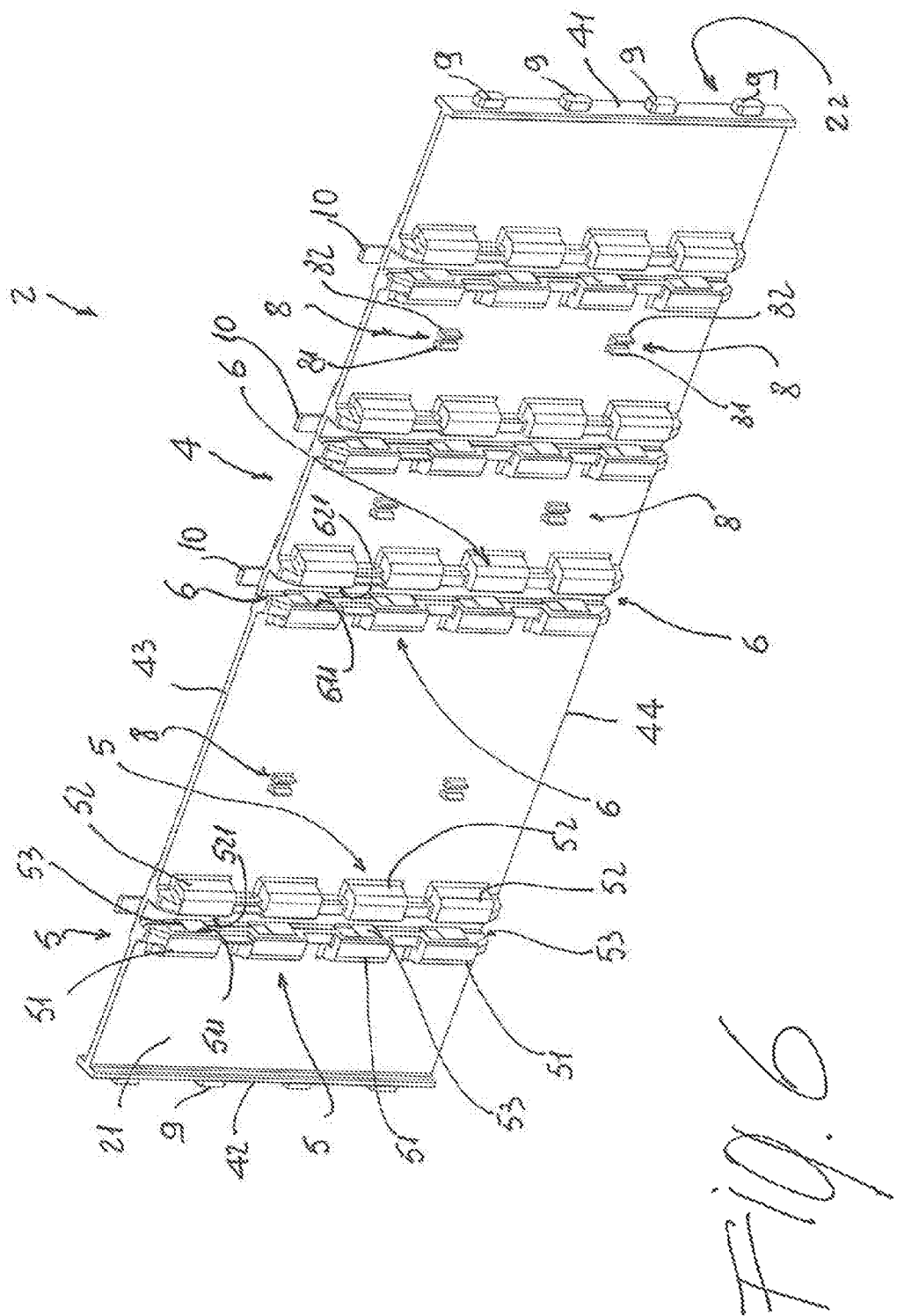

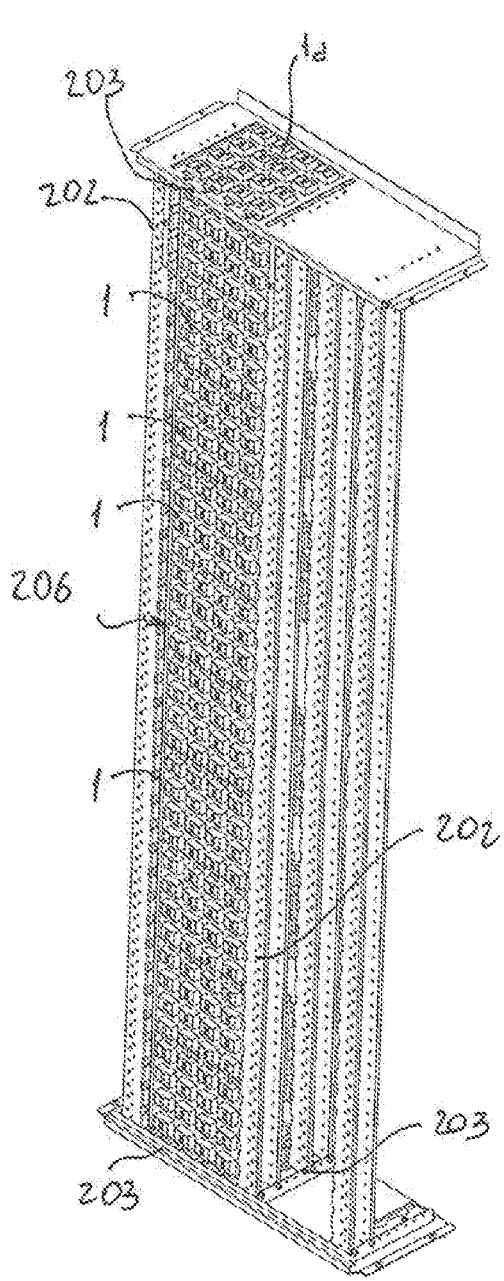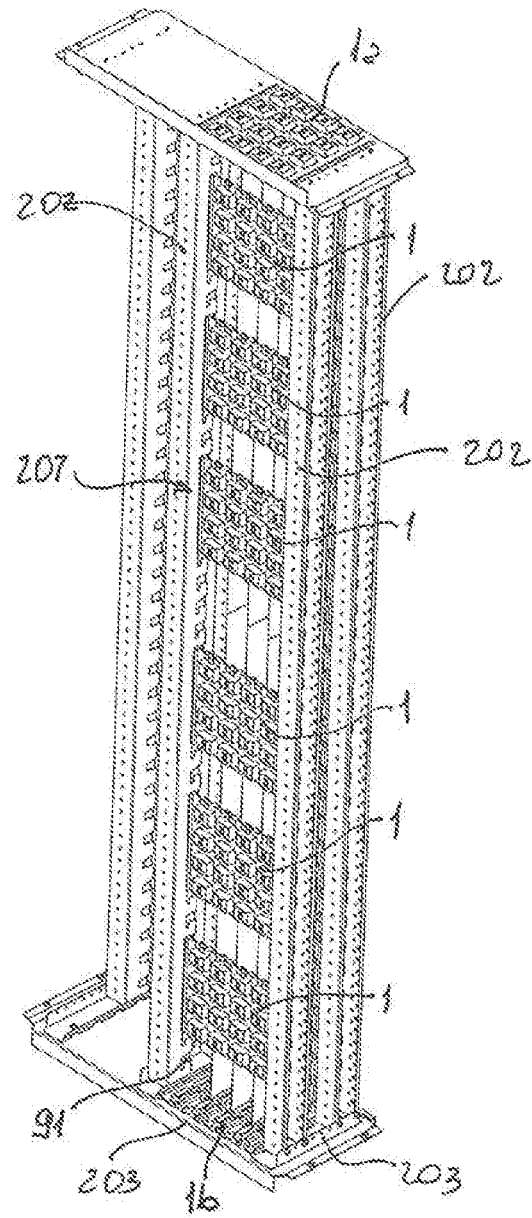

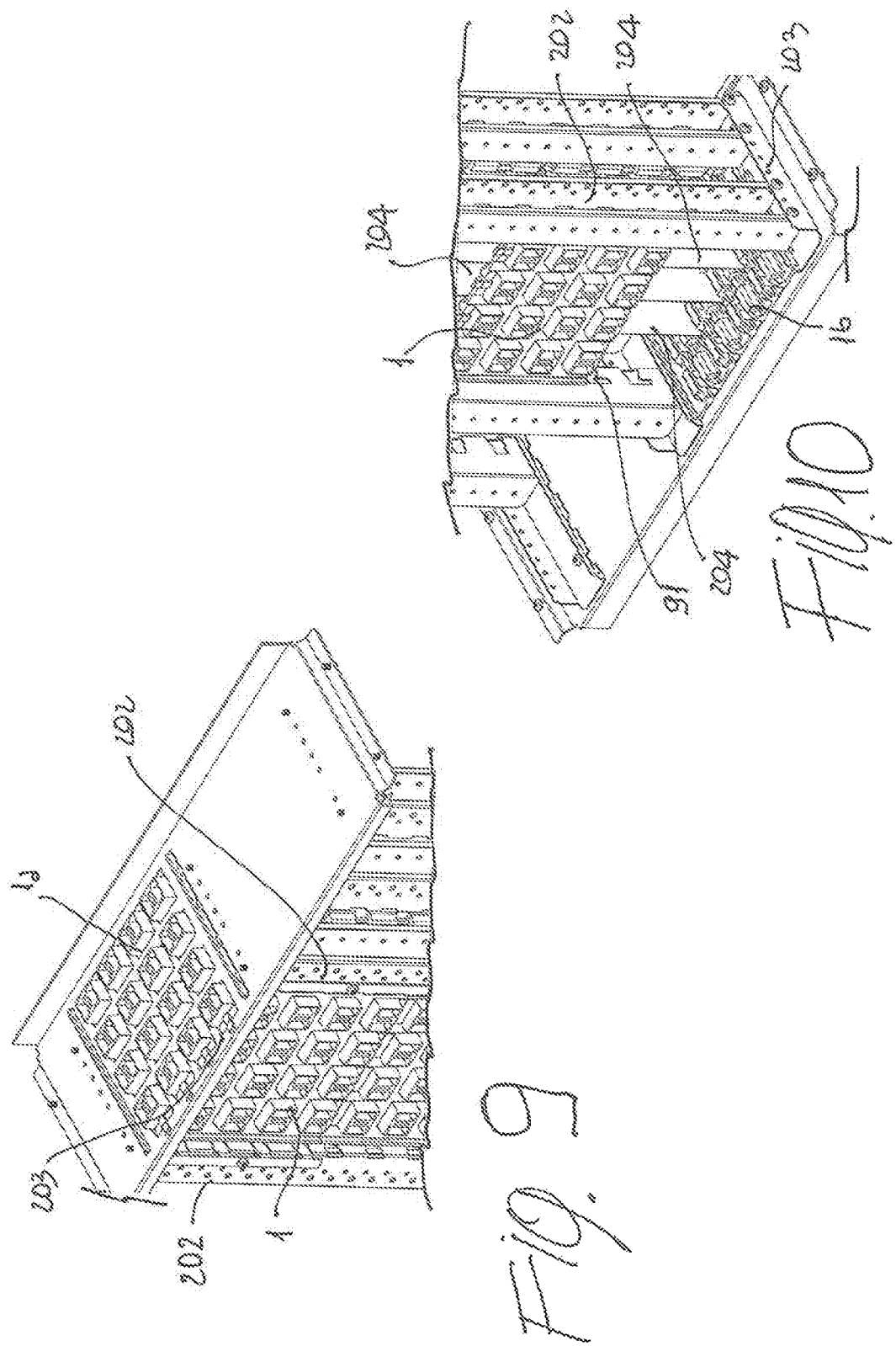

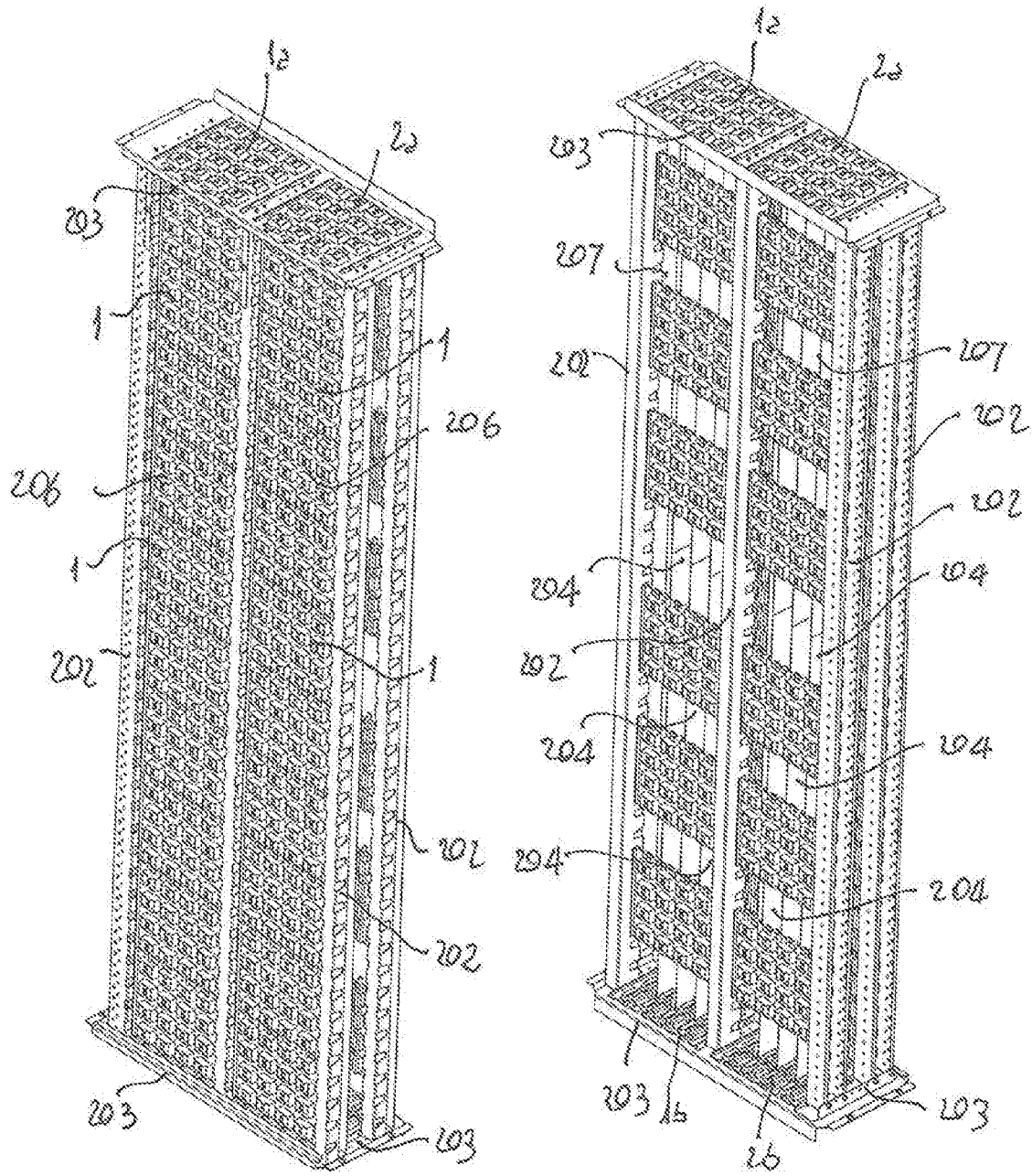

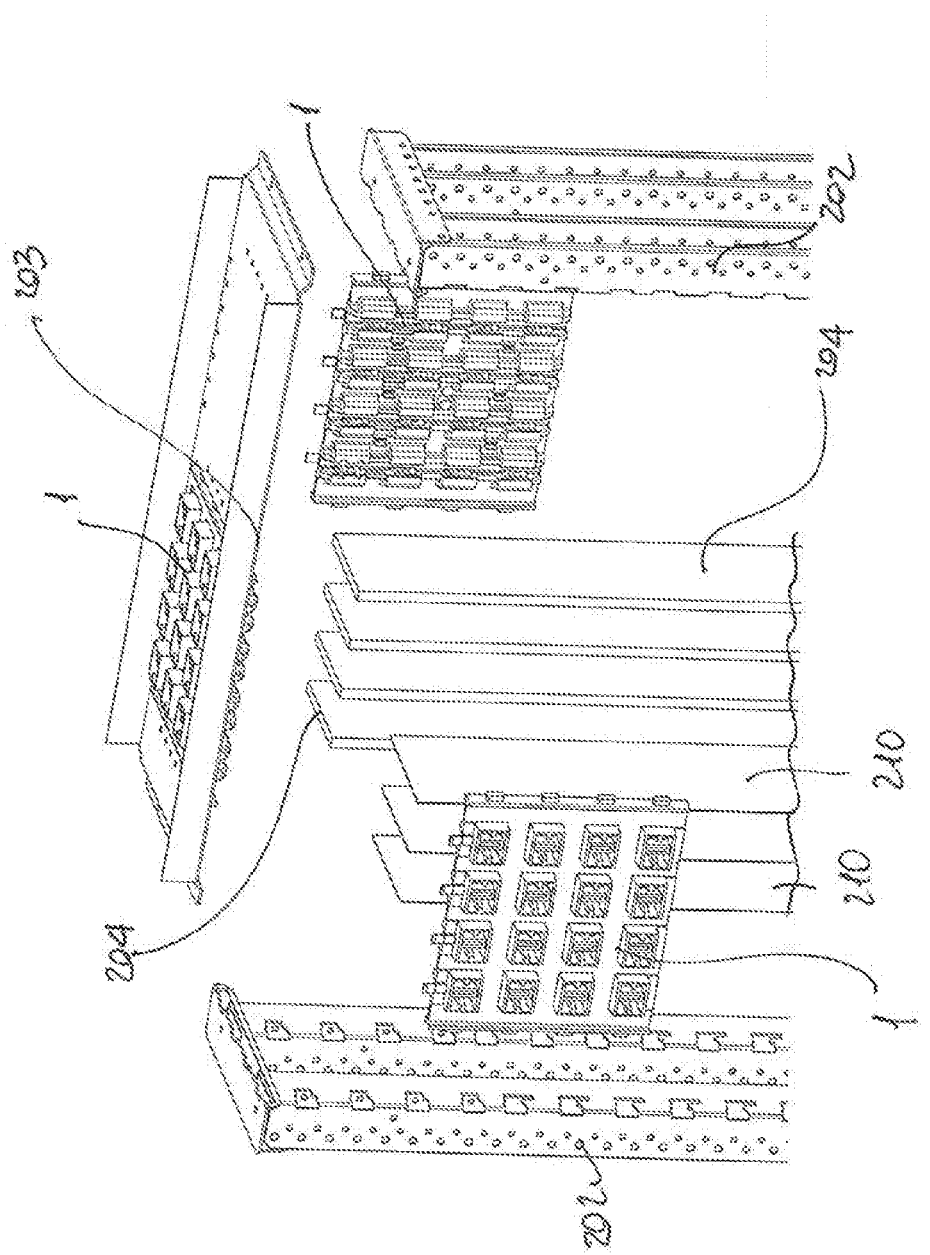

COMPARTMENT-PARTITIONING AND BUSBAR-SUPPORTING DEVICE IN A CABINET FOR A LOW VOLTAGE ELECTRICAL SWITCHBOARD

The present invention relates to a compartment-partitioning/separation and busbar-supporting device in a cabinet for an electrical switchboard, in particular a low voltage electrical switchboard, said device having improved functions and characteristics.

Generally, cabinets for low-voltage electrical distribution switchboards are specifically designed and built so as to meet the functional and installation requirements of the components that constitute the switchboard. It is in fact known that electrical switchboards use a system of mutually parallel metallic bars, each of which is connected to a corresponding polarity or phase of a power supply system. Inside the cabinet, the bars are electrically connected to the apparatuses used in the switchboard, for example circuit breakers, switches, pushbuttons, control instruments and similar apparatuses, and are geometrically coupled to appropriate insulation and supporting devices. The connection between busbars and apparatuses is formed by means of appropriate conductors, such as for example plates, appropriately shaped according to the type of apparatus.

The busbar-supporting devices, in addition to mutually electrically insulating the bars, allow connecting them to the structure of the cabinet. In this manner, any electrodynamic stresses produced by the flow of current in the bars are discharged onto the structure of the cabinet, which accordingly must have adequate structural strength characteristics. Furthermore, the electrical devices are arranged on one or more fixing guides, which are connected to the frame of the cabinet either directly or by using additional connecting elements.

Within the cabinets of the switchboards, the bars are coupled geometrically to purposely designed devices that support the bars, insulating them electrically from one another, and enable their connection to the more resistant frame of the cabinet. In this way, in addition to the normal structural support, said devices also enable the possible electrodynamic stresses produced by the flow of current in the bars to be discharged on the frame.

In order to keep separated, for safety reasons, the busbars from the front volume of the switchboard into which the apparatuses are housed, an insulating partition is normally provided in the switchboard.

At the current state of the art, the use of supporting devices of a known type presents some drawbacks, above all as regards the number and kind of components which are required for supporting the busbars and for creating an insulating partition between the busbars compartment and the apparatus compartment.

Indeed, with reference to FIG. 1, a conventional switchboard 100 normally comprises a supporting structure having a base 101 and a top 102 which are structurally connected by vertical uprights 103. A number of plates 104 are provided inside the switchboard to create a partition between the busbar compartment and the apparatus compartment 105 located on the front of the switchboard 100.

With reference to FIG. 2, the various busbars 106 are supported at various height by a number of front supports 107 which are fixed to a front mounting bracket 108, and by a number of rear supports 109 which are fixed to a rear mounting bracket 110. It is worth noting that the rear supports 109 have normally different shapes and dimensions with respect to the front supports 107. In addition, the rear mounting brackets 110 have normally different shapes and dimensions with respect to the front mounting brackets 108.

The plates 104, the front mounting bracket 108 and the rear mounting bracket 110 are fixed to the supporting structure of the switchboard 100 by a number of screws 111.

It is clear from the above that the existing solution is clearly disadvantageous in so far as it involves the use of a high number of constructional components (e.g., the plates 104, the front supports 107 and the corresponding front mounting brackets 108, the rear supports 109 and the corresponding rear mounting brackets 110) which require screw means for their fixing, with a consequent increase in the production costs and in the production times, as well as in the times and difficulties of assembly.

Moreover, further devices are required to fix and isolate the top and bottom ends of the busbars 106, thereby further increasing the number of constructional components, and consequently the constructional complexity and the corresponding drawbacks in terms of manufacturing and assembling costs and times.

A further problem is given by the fact that the busbars 106 are supported by the front 107 and rear 109 supports only at discrete points along their vertical development (i.e. not continuously) thereby making difficult for the busbars assembly 106 to withstand the electrodynamic stresses, particularly under short circuit conditions. Such problem can be only partially solved by using a high number of front 107 and rear 109 supports closely spaced from each other along the vertical development of the busbars 106, but such a solution further increases the number of components and complicates the assembly procedure of the busbars 106 into the switchboard 100.

Hence, the present disclosure is aimed at providing a device for compartment-partitioning and busbar support in a cabinet for an electrical switchboard, in particular for low voltage switchboards, which allows overcoming at least some of the above-mentioned shortcomings.

In particular, the present invention is aimed at providing a device for compartment-partitioning and busbar support in a cabinet for an electrical switchboard, in particular for low voltage switchboards, which allows reducing the number of components needed for fixing the busbars assembly in the switchboard.

Furthermore, the present invention is aimed at providing a device for compartment-partitioning and busbar support in a cabinet for an electrical switchboard, in particular for low voltage switchboards, which allows maintaining the required insulation and partitioning between the busbars compartment and the apparatus compartments in the low voltage switchboard.

In addition, the present invention is aimed at providing a device for compartment-partitioning and busbar support in a cabinet for an electrical switchboard, in particular for low voltage switchboards, which allows the busbars assembly to withstand the electrodynamic stresses, even under short circuit conditions and/or internal arc conditions.

Also, the present invention is aimed at providing a device for compartment-partitioning and busbar support in a cabinet for an electrical switchboard, in particular for low voltage switchboards that is reliable and relatively easy to produce at competitive costs.

Thus, the present invention relates to a compartment-partitioning and busbar-supporting device for a cabinet for a low voltage electrical switchboard which comprises a supporting structure having vertical uprights and horizontal crossbars and housing one or more busbars and one or more electrical apparatuses. The compartment-partitioning and busbar-supporting device of the present invention is characterized in that it comprises an insulating body having a substantially rectangular shape with a first surface configured for coupling with one or more of said busbars and a second surface configured for coupling with one or more of said electrical apparatuses, said first and second surfaces being delimited by a first and a second opposite side substantially parallel to each other and configured for coupling with one of said vertical uprights or horizontal crossbars of said supporting structure of said low voltage electrical switchboard, and a third and a fourth opposite sides substantially parallel to each other and perpendicular to said first and second opposite sides and configured for allowing vertical stacking of a plurality of said compartment-partitioning and busbar-supporting devices in correspondence of said third and fourth opposite sides, said first surface being provided with a plurality of retaining pairs of first and second retaining means facing each other and defining a retaining space for a busbar among them, the retaining pairs for a given busbar being aligned in a direction parallel to said first and second opposite sides and the retaining pairs for different busbars being spaced apart in a direction parallel to said third and a fourth opposite sides, said second surface being provided with a plurality of openings configured for allowing insertion of connection means between said electrical apparatuses and said busbars through said compartment-partitioning and busbar-supporting device.

As better explained in the following description, thanks to the particular structure of the device for compartment-partitioning and busbar support in a cabinet for an electrical switchboard of the present invention, the above-mentioned problems can be avoided, and the whole system is flexible, simple, and very easy to operate.

Indeed, the device of the present invention combines in one and the same body both busbar-supporting function and compartment-partitioning function, thereby greatly reducing the number of components needed for supporting the busbars assembly into the switchboard and for creating a partition between the busbars compartment and the apparatus compartment.

As better explained in the following description, the plurality of retaining pairs of first and second retaining means provided on the first surface of insulating body allows supporting and maintaining into position also in the presence of high electrodynamic stresses due to short circuit conditions and/or internal arching.

Moreover, the proper vertical stacking of a plurality of compartment-partitioning and busbar-supporting device according to the invention allows creating an effecting insulating and partitioning wall between the busbar compartment and the apparatus compartment inside a low voltage switchboard.

The direct coupling of the first and second opposite side of the insulating body with one of said vertical uprights or horizontal crossbars of the low voltage switchboard allows avoiding the use of relatively complicated and time-consuming fixing means, such as screw means.

As a further advantage, the compartment-partitioning and busbar-supporting device of the present invention can be used to support the busbars and delimit the busbars compartments not only in the vertical direction but also in the horizontal direction, since it can be positioned horizontally in correspondence of the top and/or bottom of said low voltage electrical switchboard to create a supporting and insulating "roof" and "floor" for the busbars in the busbars compartment.

Preferably, the compartment-partitioning and busbar-supporting device, according to the present invention, conveniently comprises, for a given busbar, a plurality of retaining pairs spaced apart along a direction parallel to said first and second opposite sides. In this way, it is possible to achieve an effective supporting function of a busbar with a considerable saving of material, and related costs, with respect to a continuous support from the top to the bottom of a given busbar.

For example, said first and second retaining means of said retaining pairs can respectively comprise a first and a second retaining tooth having a respective first and second retaining surface which faces each other so as to define said retaining space for a busbar among them.

In such a case, in a preferred embodiment of the compartment-partitioning and busbar-supporting device, according to the invention, said first and second retaining surfaces are configured for supporting and holding in place a corresponding busbar by mechanical interference between said first and second retaining surfaces and the surfaces of said busbar.

In other words, according to this embodiment, the first and second retaining surfaces of the first and a second retaining tooth are shaped so as to create a mechanical friction between said retaining surfaces and the surfaces of the busbar inserted between them which is sufficient to support and maintain in place the busbar. Moreover, said first and second retaining surfaces of the first and a second retaining tooth can be shaped so as to be able to house busbars of different dimensions, thereby further increasing the application flexibility of the compartment-partitioning and busbar-supporting device of the invention.

In a particularly preferred embodiment of the compartment-partitioning and busbar-supporting device, according to the invention, the first surface of the insulating body is provided with a plurality of fixing means for fixing insulating separator between said busbars. In this way, it is possible to improve the insulation between the phases and makes the switchboard able to withstand internal arching phenomena.

In such a case, for example, said fixing means may conveniently comprise a plurality of fixing teeth spaced apart along a direction parallel to said first and second opposite sides. In this way, it is possible to create a separating wall of insulating material between the different phases, i.e. between the various busbars.

In a largely preferred embodiment of the compartment-partitioning and busbar-supporting device, according to the present invention, at least some—but preferably all—of said plurality of openings are provided with a raised edge protruding from said second surface of said insulating body. In this way, it is possible to increase the air distance between the phases during extraction of the means, e.g. clamps, connecting said electrical apparatuses and said busbars, as well as to achieve the IP20 protection between live parts of the switchboard.

As previously said, one of the advantages of the compartment-partitioning and busbar-supporting device, according to the invention, is given by the fact that it does not require the huge amount of screws normally used in the various devices of the prior art. Accordingly, in a largely preferred embodiment of the compartment-partitioning and busbar-supporting device, according to the invention, said first and a second opposite side of said insulating body are conveniently provided with quick coupling means with one of said vertical uprights or horizontal crossbars of said supporting structure of said low voltage electrical switchboard.

For instance, said quick coupling means can conveniently comprise a shaped protrusion which is configured to engage in a corresponding slot of one of said vertical uprights or horizontal crossbars of said supporting structure of said low voltage electrical switchboard, thereby quickly fixing the device in the proper vertical or horizontal position.

In an exemplary embodiment of the compartment-partitioning and busbar-supporting device, according to the invention, the insulating body is provided with a plurality of protection tabs which spaced apart along said third side of said insulating body and are configured to protect a corresponding busbar when said compartment-partitioning and busbar-supporting device is mounted at the top or at the bottom of said low voltage electrical switchboard.

In other words, when the compartment-partitioning and busbar-supporting device of the invention is horizontally mounted in correspondence of the top or bottom of the switchboard, said tabs project respectively over the top end or under the bottom end of a corresponding busbar thereby protecting it from undesired contacts.

In a further aspect, the present invention also relates to a low voltage electrical switchboard comprising a supporting structure having vertical uprights and horizontal crossbars and configured for housing one or more busbars and one or more electrical apparatuses, which is characterized in that it comprises one or more compartment-partitioning and busbar-supporting device as described herein.

Typically, the low voltage electrical switchboard, according to the invention, comprises a busbar compartment (normally housing a plurality of vertically arranged busbars) and an apparatus compartment (normally housing one or more electrical apparatuses, such as circuit breakers, switches, pushbuttons, control instruments and similar apparatuses). The busbar compartment and the apparatus compartment are separated by a continuous partition wall which is made of a plurality of compartment-partitioning and busbar-supporting devices as described in the present disclosure vertically stacked on each other.

Moreover, the low voltage electrical switchboard, according to the invention can conveniently comprise at least a first and a second compartment-partitioning and busbar-supporting device as described herein, which respectively positioned at the top or at the bottom of said low voltage electrical switchboard so as to support and maintain in position the top and bottom ends of the busbars.

Preferably the low voltage electrical switchboard, according to the present invention, conveniently comprises a wall, normally the rear wall of the busbar compartment, having a plurality of compartment-partitioning and busbar-supporting devices as disclosed herein spaced apart in the vertical direction. In practice, the rear wall of the busbar compartment is not completely closed by the compartment-partitioning and busbar-supporting devices (as the partition wall between the busbar compartment and the apparatus compartment), but is partially open, the number of compartment-partitioning and busbar-supporting devices used in such rear wall depending on the rated Icw of the switchboard.

In practice, in an exemplary embodiment of a low voltage electrical switchboard, according to the present invention, the busbar compartment comprises a continuous partition wall made of a plurality of compartment-partitioning and busbar-supporting devices closely stacked on each other, and a rear wall opposite to said continuous partition wall, said rear wall having a plurality of compartment-partitioning and busbar-supporting devices spaced apart in the vertical direction.

Further features and advantages of the present invention will be more clear from the description of preferred but not exclusive embodiments of a compartment-partitioning and busbar-supporting device, according to the present invention, and of a low voltage switchboard comprising a plurality of such devices, shown by way of examples in the accompanying drawings, wherein:

FIG. 2 is an exploded view of the components of a supporting device and of a partition plate according to the prior art;

FIG. 3 is a first perspective view of a first embodiment of a compartment-partitioning and busbar-supporting device for a cabinet for a low voltage electrical switchboard according to the invention;

FIG. 4 is a second perspective view of a first embodiment of a compartment-partitioning and busbar-supporting device for a cabinet for a low voltage electrical switchboard according to the invention;

FIG. 5 is a first perspective view of a second embodiment of a compartment-partitioning and busbar-supporting device for a cabinet for a low voltage electrical switchboard according to the invention;

FIG. 6 is a second perspective view of a second embodiment of a compartment-partitioning and busbar-supporting device for a cabinet for a low voltage electrical switchboard according to the invention;

FIG. 7 is a first perspective view of a first busbar assembly equipped with a first embodiment of a compartment-partitioning and busbar-supporting device for a cabinet for a low voltage electrical switchboard according to the invention, as illustrated in FIGS. 3 and 4;

FIG. 8 is a second perspective view of a first busbar assembly equipped with a first embodiment of a compartment-partitioning and busbar-supporting device for a cabinet for a low voltage electrical switchboard according to the invention, as illustrated in FIGS. 3 and 4;

FIG. 9 is a detailed view of the top portion of a the first busbar assembly illustrated in FIGS. 7 and 8;

FIG. 10 is a detailed view of the bottom portion of a the first busbar assembly illustrated in FIGS. 7 and 8;

FIG. 11 is a first perspective view of a second busbar assembly equipped with a first embodiment of a compartment-partitioning and busbar-supporting device for a cabinet for a low voltage electrical switchboard according to the invention, as illustrated in FIGS. 3 and 4;

FIG. 12 is a second perspective view of a second busbar assembly equipped with a first embodiment of a compartment-partitioning and busbar-supporting device for a cabinet for a low voltage electrical switchboard according to the invention, as illustrated in FIGS. 3 and 4;

FIG. 15 is an exploded view of some components a low voltage electrical switchboard equipped with a first embodiment of a compartment-partitioning and busbar-supporting device for a cabinet for a low voltage electrical switchboard according to the invention.

Figure 1:
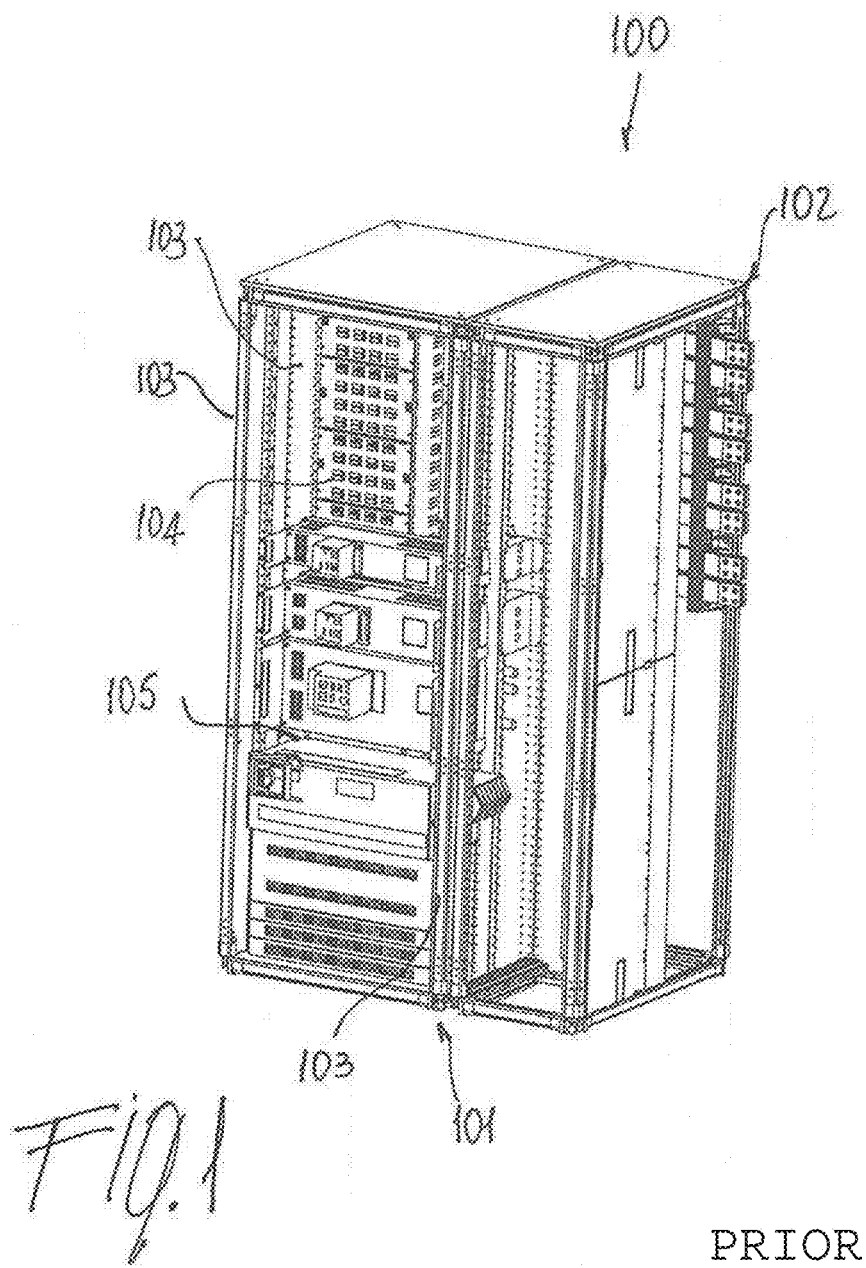
FIG. 1 is a perspective view of a low voltage electrical switchboard according to the prior art.

With reference to the attached figures, the compartment-partitioning and busbar-supporting device 1, 2 of the present invention is configured to be used in a cabinet for a low voltage electrical switchboard 200 which comprises a supporting structure 201 having vertical uprights 202 and horizontal crossbars 203 and housing one or more busbars 204 and one or more electrical apparatuses 205.

With reference to FIGS. 3 to 6—in its more general definition—the compartment-partitioning and busbar-supporting device 1, 2 of the present invention comprises an insulating body 3, 4 which has a substantially rectangular shape. In the embodiment of FIGS. 3 and 4, the device 1 is adapted to be used with busbars spaced with at 50 mm distance, while in the embodiment of FIGS. 5 and 6, the device 2 is adapted to be used with busbars spaced with a 185 mm distance. In both cases, the essential technical features are the same and the two embodiments will be described together. The shaped body 3, 4 of the compartment-partitioning and busbar-supporting device 1, 2 is provided with a first surface 11, 21 which is configured for coupling with one or more of vertically-mounted busbars 204 in the switchboard 200, and with a second surface 12, 22 configured for coupling with one or more of electrical apparatuses 205 housed in the switchboard 200.

The first 11, 21 and second 12, 22 surfaces of the insulating body 3, 4 are delimited by a first 31, 41 and a second 32, 42 opposite side which are substantially parallel to each other and are configured for coupling with one of said vertical uprights 202 or horizontal crossbars 203 of the supporting structure 201 of the low voltage electrical switchboard 200, as better described hereinafter.

The first 11, 21 and second 12, 22 surfaces of the insulating body 3, 4 are also delimited by a third 33, 43 and a fourth 34, 44 opposite sides which are substantially parallel to each other and are perpendicular to said first 31, 41 and second 32, 42 opposite sides. The third 33, 43 and fourth 34, 44 opposite sides are configured for allowing vertical stacking of a plurality of said compartment-partitioning and busbar-supporting devices 1, 2 in correspondence of said third 33, 43 and fourth 34, 44 opposite sides. In other words, a plurality of insulating bodies 3, 4 can be stacked on each other in correspondence of the third 33, 43 and fourth 34, 44 opposite sides, so as to create a continuous wall, as better described hereinafter.

One of distinguishing features of the compartment-partitioning and busbar-supporting device 1, 2 of the present invention is given by the fact that said first surface 11, 21 is provided with a plurality of retaining pairs 5, 6 of first 51, 61 and second 52, 62 retaining means which face each other so as to define a retaining space 53, 63 for a busbar 204 among them.

As clearly shown in the attached figures, the retaining pairs 5 for a given busbar 204 are aligned in a direction parallel to said first 31, 41 and second 32, 42 opposite sides and the retaining pairs 5, 6 for different busbars 204 are spaced apart in a direction parallel to said third 33, 43 and a fourth 34, 44 opposite sides. In practice, with reference to FIGS. 4 and 6, the retaining pairs 5 are designed to support a first busbar, while the adjacent retaining pairs 6 are designed to support a second busbar, adjacent to the first busbar. The same structure is repeated for the further adjacent busbars.

With reference to FIGS. 3 and 5, a further distinguishing features of the compartment-partitioning and busbar-supporting device 1, 2 of the present invention is given by the fact that said second surface 12, 22 is provided with a plurality of openings 7 which are configured for allowing insertion of connection means, e.g. clamps, between said electrical apparatuses 205 and said busbars 204 through said compartment-partitioning and busbar-supporting device 1, 2. Shape and dimensions of the openings can be adapted according to the needs, e.g. according to the shape, dimensions and number of fixing clamps.

In practice, the first surface 11, 21 of the insulating body 3, 4 is oriented toward the busbar compartment of the switchboard and the second surface 12, 22 is oriented toward the apparatus compartment of the switchboard, so that the compartment-partitioning and busbar-supporting device 1, 2 of the present invention has the double function of supporting the busbars 204 (through the retaining pairs 5, 6) and creating an effective insulating partition wall between the busbar compartment and the apparatus compartment of the switchboard 200.

As shown in the attached figure, in a preferred embodiment of the compartment-partitioning and busbar-supporting device 1, 2 of the present invention, the first surface 11, 21 of the shaped body 3, 4 is provided, for a given busbar 204, with a plurality of retaining pairs 5, 6 which are spaced apart along a direction parallel to said first 31, 41 and second 32, 42 opposite sides. In practice, instead of having a continuous retaining pair running along the first surface 11, 21 parallel to the first 31, 41 and second 32, 42 opposite sides, it is preferable to have a number of such pairs spaced apart, thereby achieving an effective supporting function at discrete points of a busbar. Such solution allows a considerable saving of material, and related costs, with respect to a continuous support from the top to the bottom of a given busbar.

In an exemplary embodiment of the compartment-partitioning and busbar-supporting device 1, 2 of the present invention, first 51, 61 and second 52, 62 retaining means of said retaining pairs 5, 6 respectively comprise a first and a second retaining tooth having a respective first 511, 611 and second 521, 621 retaining surface facing each other and defining the retaining space 53, 63 for a busbar 204 among them.

The supporting and retaining action of the first 51, 61 and second 52, 62 retaining means can be carried out in various ways.

In a simple but effective embodiment of the compartment-partitioning and busbar-supporting device 1, 2 of the present disclosure, the first 511, 611 and second 521, 621 retaining surfaces can be configured for supporting and holding in place a corresponding busbar 204 by mechanical interference between said first 511, 611 and second 521, 621 retaining surfaces and the surfaces of said busbar 204. Indeed, by properly shaping the first 511, 611 and second 521, 621 retaining surfaces it is possible to make the system usable with busbars of different dimensions (e.g., 60, 80, 100, 120 mm), thereby increasing the flexibility of use of the compartment-partitioning and busbar-supporting device 1, 2 of the present invention. Depending on the shape and dimensions of the busbars, other coupling systems of the device 1,2 of the invention with said busbars (e.g., clipping, snap fitting, and similar systems) can be devised according to the needs.

In a particular embodiment of the compartment-partitioning and busbar-supporting device 1, 2, according to the present invention, the first surface 11, 21 of said insulating body 3, 4, can be provided with a plurality of fixing means 8 for fixing insulating separator 210 between said busbars 204. Such a solution allows improving the insulation between the phases and makes the switchboard able to withstand internal arching phenomena As an exemplary embodiment, said fixing means 8 can conveniently comprise a plurality of fixing teeth 81, 82 which are spaced apart along a direction parallel to said first 31, 41 and second 32, 42 opposite sides. Other solutions for the fixing means are also possible depending on the needs.

In a largely preferred embodiment of the compartment-partitioning and busbar-supporting device 1, 2, according to the invention, at least some—but preferably all—of said plurality of openings 7 are provided with a raised edge 71 protruding from said second surface 12, 22 of said insulating body 3, 4 and surrounding the opening 7. The presence of the raised protects the contact zone between the electrical apparatuses and the busbars, increases the distance in air between the phases and helps avoiding the striking of accidental arcs.

In a further preferred embodiment of the compartment-partitioning and busbar-supporting device 1, 2, according to the invention, the first 31, 41 and a second 32, 42 opposite side of the insulating body 3, 4 are provided with quick coupling means 9 which allow a quick and easy connection of the device 1, 2 with one of said vertical uprights 202 or horizontal crossbars 203 of said supporting structure 201 of said low voltage electrical switchboard 200, thereby allowing a quick and easy assembly of the compartment-partitioning and busbar-supporting device 1, 2 in the switchboard 200.

As an exemplary embodiment, said quick coupling means 9 can conveniently comprise a shaped protrusion which is configured to engage in a corresponding slot 91 of one of said vertical uprights 202 or horizontal crossbars 203 of said supporting structure 201 of said low voltage electrical switchboard 200. Other quick coupling means, e.g. snap-fit or sliding joints, can also be selected according to the needs.

As previously said, one of the outstanding features of the compartment-partitioning and busbar-supporting device 1, 2, according to the present invention, is the possibility to use it not only to create the vertical partition and supporting wall between the busbar compartment and the apparatus compartment, but also to horizontally mount it at the top and bottom of the switchboard to support the top and bottom ends of the busbar.

In such a case, the insulating body 3, 4 of the compartment-partitioning and busbar-supporting device 1, 2 is conveniently provided with a plurality of protection tabs 10 which are spaced apart along said third side 33, 43 of said insulating body 3, 4. The protection tabs 10 are conveniently configured to protect a corresponding busbar 204 when said compartment-partitioning and busbar-supporting device 1a, 1b; 2a, 2b is mounted at the top or at the bottom of said low voltage electrical switchboard (200).

With reference to FIGS. 7-14 a complete busbar assembly (FIGS. 7-12) in a low voltage switchboard 200 according to the present invention conveniently comprise a partition wall 206 made of a plurality of compartment-partitioning and busbar-supporting devices 1 according to the present disclosure which are vertically stacked on each other so as to create a vertical insulating wall between the busbars 204 and the electrical apparatuses 205 on the front side of the switchboard 200.

The partition wall 206 is conveniently realized by fixing a plurality of the compartment-partitioning and busbar-supporting device 1 on vertical uprights 202 of the supporting structure 201 of the switchboard 200, e.g., by engaging the shaped protrusion 9 positioned on the first 31, 41 and second 32, 42 opposite side of the insulating body 3, 4 in corresponding slots 91 on the vertical uprights 202.

Figure 13:
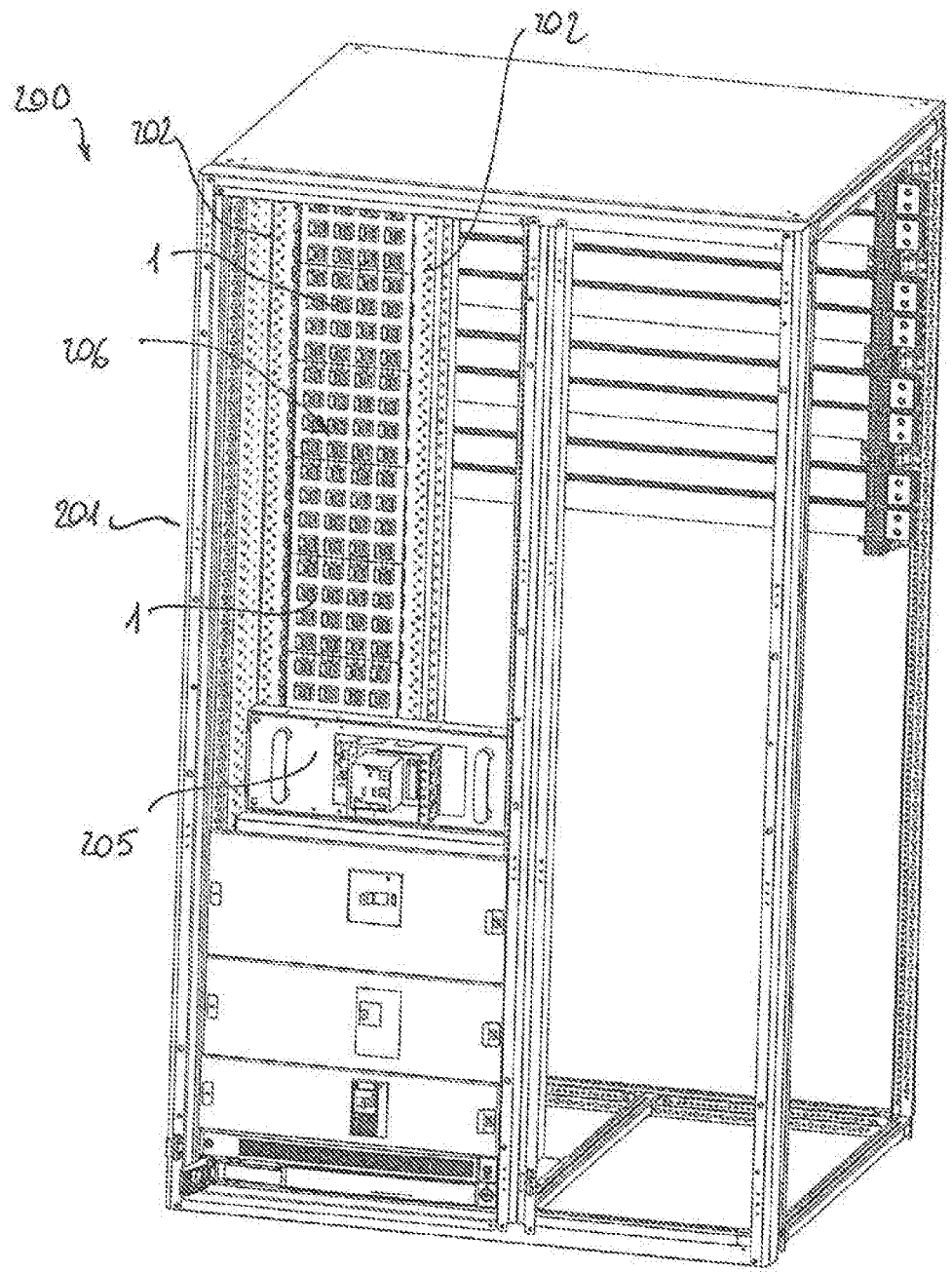
FIG. 13 is a perspective view of a low voltage electrical switchboard equipped with a first embodiment of a compartment-partitioning and busbar-supporting device for a cabinet for a low voltage electrical switchboard according to the invention, as illustrated in FIGS. 3 and 4, without the front doors.
Figure 14:
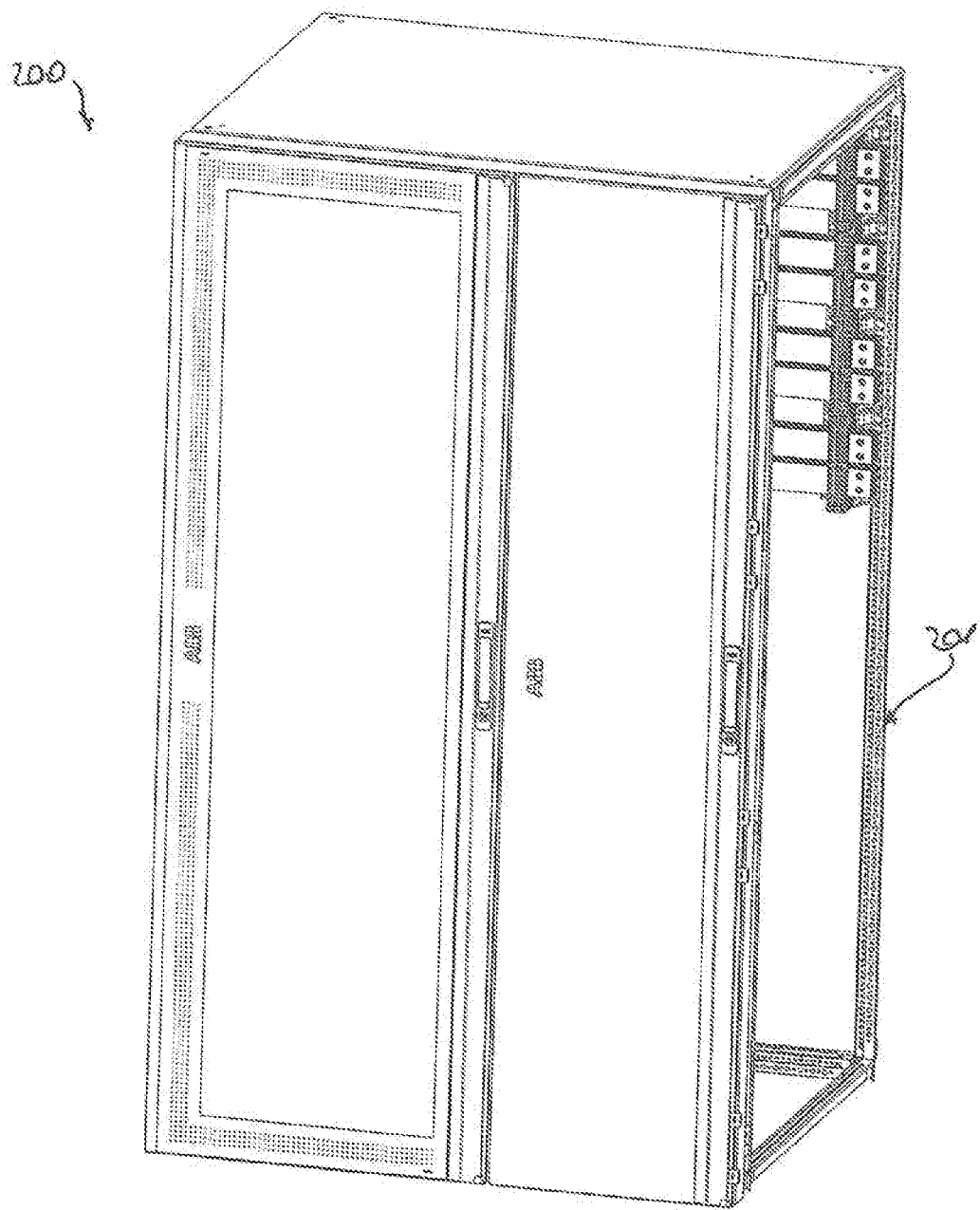
FIG. 14 is a perspective view of a low voltage electrical switchboard equipped with a first embodiment of a compartment-partitioning and busbar-supporting device for a cabinet for a low voltage electrical switchboard according to the invention, as illustrated in FIGS. 3 and 4, with the front doors.

Thus, as shown in FIG. 13, the low voltage electrical switchboard 200, according to the invention, comprises a busbar 204 compartment and an apparatus 205 compartment which are separated by the continuous partition wall 206 which is entirely made of a plurality of compartment-partitioning and busbar-supporting devices 1 which are vertically stacked on each other. The continuous partition wall 206 therefore has the double purpose of supporting the busbars 204 and separating the two compartments, but at the same time allows connecting the electrical apparatuses 205 to the busbars 204 through the opening 7 of the compartment-partitioning and busbar-supporting device 1, 2.

The busbar assembly further comprises at least a first compartment-partitioning and busbar-supporting device 1a, 2a positioned at the top of the low voltage electrical switchboard 200 as well as at least a second compartment-partitioning and busbar-supporting device 1b, 2b positioned at bottom of said low voltage electrical switchboard 200.

The top and bottom supporting closures can be conveniently realized by fixing at least a first compartment-partitioning and busbar-supporting device 1a, 2a on horizontal crossbars 203 positioned on the top of the supporting structure 201 of the switchboard 200, and at least a second compartment-partitioning and busbar-supporting device 1b, 2b on horizontal crossbars 203 positioned on the bottom of the supporting structure 201 of the switchboard 200.

Fixing of the a first and second compartment-partitioning and busbar-supporting device 1a, 2a; 1b, 2b can be made, e.g., by engaging the shaped protrusion 9 positioned on the first 31, 41 and second 32, 42 opposite side of their insulating body in corresponding slots on the horizontal crossbars 203. Moreover, the busbar assembly of the low voltage electrical switchboard 200 further comprises a wall 207 having a plurality of compartment-partitioning and busbar-supporting devices 1, 2 according to the present invention which are spaced apart along the vertical direction of the switchboard 200. Differently from the partition wall 206 the rear wall 207 of the busbar compartment is not completely closed by the compartment-partitioning and busbar-supporting devices 1, but is partially open, the number of compartment-partitioning and busbar-supporting devices 1 used in such rear wall 207 wall depending on the needs.

As for the partition wall 206, also the rear wall 207 is conveniently realized by fixing a plurality of the compartment-partitioning and busbar-supporting device 1 on vertical uprights 202 of the supporting structure 201 of the switchboard 200, e.g., by engaging the shaped protrusion 9 positioned on the first 31, 41 and second 32, 42 opposite side of the insulating body 3, 4 in corresponding slots 91 on the vertical uprights 202.

With reference to FIGS. 11 and 12, a further advantage that can be achieved with the compartment-partitioning and busbar-supporting device 1 of the present disclosure is given by the possibility of mounting within the same column, two vertical distribution systems, as clearly shown in the above-cited figures.

It is clear from the above description that the compartment-partitioning and busbar-supporting device according to the present disclosure, as well as a low voltage switchboard comprising such compartment-partitioning and busbar-supporting device, fully achieve the intended aims and solved the above-highlighted problems of the existing devices and switchboards.

Indeed, the compartment-partitioning and busbar-supporting device according to the present disclosure greatly reduces the number of components needed, since with one and the same device it is possible achieve the busbar-supporting function and compartment-partitioning function on all sides (front, rear, top and bottom) of the busbar compartments, maintaining at the same time the possibility of quickly connecting the electrical apparatuses to the busbars through the opening of the compartment-partitioning and busbar-supporting device. This can be easily seen by comparing FIGS. 2 and 15.

As previously pointed out, the assembly procedures are greatly simplified since only quick coupling means are used to fix the compartment-partitioning and busbar-supporting device to the supporting structure of the switchboard.

Moreover, the system is very flexible since it can be used with busbars of different dimensions (60, 80, 100, 120 mm) and/or with different distance (50, 185 mm) among them.

Several variations can be made to the compartment-partitioning and busbar-supporting device—as well as to the low voltage switchboard comprising such compartment-partitioning and busbar-supporting device thus conceived—all falling within the scope of the attached claims. In practice, the materials used and the contingent dimensions and shapes can be any, according to requirements and to the state of the art.

The invention claimed is:

1. A compartment-partitioning and busbar-supporting device for a cabinet for a low voltage electrical switchboard comprising: a supporting structure having vertical uprights and horizontal crossbars and housing one or more busbars and one or more electrical apparatuses, an insulating body having a substantially rectangular shape with a first surface configured for coupling with one or more of said busbars and a second surface configured for coupling with one or more of said electrical apparatuses, said first and second surfaces being delimited by a first and a second opposite side substantially parallel to each other and configured for coupling with one of said vertical uprights or horizontal crossbars of said supporting structure of said low voltage electrical switchboard, and a third and a fourth opposite sides substantially parallel to each other and perpendicular to said first and second opposite sides and configured for allowing vertical stacking of a plurality of said compartment-partitioning and busbar-supporting devices in correspondence of said third and fourth opposite sides, said first surface being provided with a plurality of retaining pairs of first and second retaining means facing each other and defining a retaining space for a busbar among them, the retaining pairs for a given busbar being aligned in a direction parallel to said first and second opposite sides and the retaining pairs for different busbars being spaced apart in a direction parallel to said third and a fourth opposite sides, said second surface being provided with a plurality of openings configured for allowing insertion of connection means between said electrical apparatuses and said busbars through said compartment-partitioning and busbar-supporting device.

2. The compartment-partitioning and busbar-supporting device, according to claim 1, wherein, for a given busbar, a plurality of retaining pairs spaced apart along a direction parallel to said first and second opposite sides.

3. The compartment-partitioning and busbar-supporting device, according to claim 1, wherein said first and second retaining means of said retaining pairs respectively comprise a first and a second retaining tooth having a respective first and second retaining surface facing each other and defining said retaining space for busbar among them.

4. The compartment-partitioning and busbar-supporting device, according to claim 3, wherein said first and second retaining surfaces are configured for supporting and holding in place a corresponding busbar by mechanical interference between said first and second retaining surfaces and the surfaces of said busbar.

5. The compartment-partitioning and busbar-supporting device, according to claim 1, further comprising a plurality of fixing means for fixing insulating separator between said busbars.

6. The compartment-partitioning and busbar-supporting device, according to claim 5, wherein said fixing means comprise a plurality of fixing teeth spaced apart along a direction parallel to said first and second opposite sides.

7. The compartment-partitioning and busbar-supporting device, according to claim 1, wherein said at least some of said plurality of openings are provided with a raised edge protruding from said second surface of said insulating body.

8. The compartment-partitioning and busbar-supporting device, according to claim 1, wherein said first and a second opposite side of said insulating body are provided with quick coupling means with one of said vertical uprights or horizontal crossbars of said supporting structure of said low voltage electrical switchboard.

9. The compartment-partitioning and busbar-supporting device, according to claim 8, wherein said quick coupling means comprise a shaped protrusion configured to engage in a corresponding slot of one of said vertical uprights or horizontal crossbars of said supporting structure of said low voltage electrical switchboard.

10. The compartment-partitioning and busbar-supporting device, according to claim 1, wherein said insulating body is provided with a plurality of protection tabs spaced apart along said third side of said insulating body and configured to protect a corresponding busbar when said compartment-partitioning and busbar-supporting device is mounted at the top or at the bottom of said low voltage electrical switchboard.

11. A low voltage electrical switchboard comprising a supporting structure having vertical uprights and horizontal cross bars and configured for housing one or more busbars and one or more electrical apparatuses, further comprising one or more compartment-partitioning and busbar-supporting device according to claim 1.

12. The low voltage electrical switchboard, according to claim 11, further comprising a busbar compartment and an apparatus compartment which are separated by a continuous partition wall made of a plurality of compartment-partitioning and busbar-supporting devices according to claim 1 vertically stacked on each other.

13. The low voltage electrical switchboard, according to claim 11, further comprising at least a first and a second compartment-partitioning and busbar-supporting device according to claim 1 respectively positioned at the top or at the bottom of said low voltage electrical switchboard.

14. The low voltage electrical switchboard, according to claim 1, further comprising a wall having a plurality of compartment-partitioning and busbar-supporting devices according to claim 1 spaced apart in the vertical direction.

15. The low voltage electrical switchboard, according to claim 12, wherein said busbar compartment comprises a rear wall opposite to said continuous partition wall, said rear wall having a plurality of compartment-partitioning and busbar-supporting devices according to claim 1 spaced apart in the vertical direction.

16. The compartment-partitioning and busbar-supporting device, according to claim 2, wherein said first and second retaining means of said retaining pairs respectively comprise a first and a second retaining tooth having a respective first and second retaining surface facing each other and defining said retaining space for busbar among them.

17. The compartment-partitioning and busbar-supporting device, according to claim 16, wherein said first and second retaining surfaces are configured for supporting and holding in place a corresponding busbar by mechanical interference between said first and second retaining surfaces and the surfaces of said busbar.

18. The compartment-partitioning and busbar-supporting device, according to claim 2, further comprising a plurality of fixing means for fixing insulating separator between said busbars.

19. The compartment-partitioning and busbar-supporting device, according to claim 18, wherein said fixing means comprise a plurality of fixing teeth spaced apart along a direction parallel to said first and second opposite sides.

20. The compartment-partitioning and busbar-supporting device, according to claim 2, wherein said at least some of said plurality of openings are provided with a raised edge protruding from said second surface of said insulating body.

* * * * *